(12) United States Patent
Sasnowski et al.

(10) Patent No.: US 7,971,892 B2
(45) Date of Patent: Jul. 5, 2011

(54) BICYCLE FRAME CONSTRUCTION

(75) Inventors: Allan Sasnowski, Stouffville (CA); John Schmider, Thornhill (CA); Franco Acacia, Keswick (CA); Fabio Venier, Holland Landing (CA)

(73) Assignee: Bionx International Inc., Aurora, Ontario (CA)

( * ) Notice: Subject to any disclaimer, the term of this patent is extended or adjusted under 35 U.S.C. 154(b) by 497 days.

(21) Appl. No.: 11/918,267

(22) PCT Filed: Apr. 11, 2006

(86) PCT No.: PCT/CA2006/000550
§ 371 (c)(1),
(2), (4) Date: Nov. 26, 2008

(87) PCT Pub. No.: WO2006/108278
PCT Pub. Date: Oct. 19, 2006

(65) Prior Publication Data
US 2009/0212530 A1 Aug. 27, 2009

Related U.S. Application Data

(60) Provisional application No. 60/670,127, filed on Apr. 11, 2005.

(51) Int. Cl.
*B62K 3/02* (2006.01)
(52) U.S. Cl. .................... 280/288.3; 280/281.1

(58) Field of Classification Search ............... 280/288.3, 280/281.1, 288.4, 828
See application file for complete search history.

(56) References Cited

U.S. PATENT DOCUMENTS

| | | | |
|---|---|---|---|
| 4,067,589 A * | 1/1978 | Hon | 280/278 |
| 4,548,422 A | 10/1985 | Michel et al. | |
| 4,550,927 A | 11/1985 | Resele | |
| 5,011,172 A | 4/1991 | Bellanca et al. | |
| 5,464,240 A * | 11/1995 | Robinson et al. | 280/281.1 |
| 5,769,442 A | 6/1998 | Robinson et al. | |
| 5,791,673 A * | 8/1998 | Patterson | 280/281.1 |
| 6,086,081 A | 7/2000 | Huang | |
| 6,123,353 A | 9/2000 | Bennett et al. | |

* cited by examiner

*Primary Examiner* — Joanne Silbermann
*Assistant Examiner* — Tashiana Adams
(74) *Attorney, Agent, or Firm* — Ogilvy Renault LLP

(57) ABSTRACT

A unitary monocoque frame is provided for a bicycle including a right half shell having a peripheral edge and a left half shell having a peripheral edge symmetrical with the peripheral edge of the right half shell. The right half shell includes an integrally formed head tube portion and an integrally formed seat tube collar. The left half shell includes a curved surface to join with the head tube portion and a cupped recess to receive the seat tube collar. A tongue extends along at least a portion of the peripheral edge of one of the right and left half shells. A groove extends along at least a corresponding portion of the peripheral edge of the other one of the right and left half shells. The tongue and groove are in mating engagement to join the right and left half shells forming the unitary monocoque frame.

20 Claims, 7 Drawing Sheets

US 7,971,892 B2

BICYCLE FRAME CONSTRUCTION

BACKGROUND OF THE INVENTION

1. Field of the Invention

The present invention relates to a frame for a vehicle such as a bicycle. More particularly, the invention relates to a bicycle frame constructed from two, thin-walled cast shells joined together to form a unitary monocoque frame.

2. Description of the Related Art

Traditionally, bicycle frames are formed from hollow steel tubes that are connected together to form a two triangle design. A front or main triangle includes a top tube, a down tube, a head tube, a seat tube, and a bottom bracket. A rear triangle includes a pair of seat stays, a pair of chain stays, and a pair of rear axle dropouts. The tubes are connected together, such as by brazing, to form the bicycle frame. The high compressive strength characteristics of steel tubes, their availability and low cost, and their formability, make them ideally suitable for the two triangle design, such that many manufacturers still use it with minor variations in frame geometry.

An essential feature of this design, however, is that all the tubes must be connected together to form the finished frame, so that formation of the frame from tubes is labor intensive. Further, the lugs or joints with which the tubes are connected must be relatively thick and hence heavy so as to provide an adequately strong connection. Another disadvantage of steel frames is the need for corrosion protection, requiring numerous additional processing steps such as spraying the frame with primer, then paint, and allowing suitable drying time in between steps.

More recently, other materials have become more readily available, such as aluminum, magnesium, titanium, and fiber-reinforced plastic composites, allowing manufacturers the ability to construct bicycle frames with reduced weight. Many manufacturers have merely substituted tubes made of these materials for steel tubes, and have employed welding or gluing of the frame joints instead of brazing in the traditional two triangle design. However, the formation of these frames remains time consuming, and in some cases, the frame is not aesthetically pleasing.

A bicycle frame that avoids many of the above-mentioned disadvantages of conventional tube frames is formed from two half shells that are bonded together to form a unitary monocoque frame. An example is shown in U.S. Pat. No. 5,464,240, which describes a hollow bicycle frame constructed from composite injection molded partial shells that are joined together using numerous protrusions and receptacles disposed along joining faces of each partial shell. These protrusions and receptacles are very small because of the wall thickness of the partial shells, and are thus relatively difficult to manufacture without defects. The protrusions may easily break before or during joining. Further, alignment of the partial shells requires an additional step of aligning the protrusions with their corresponding receptacles, which is time consuming and hence labor intensive.

There have been numerous other attempts to replace the conventional tube frame with a frame in the form of a hollow shell of formed or stamped sheet metal, molded fiberglass or the like. However, none of these attempts have been widely adopted, partially due to the fact that they did not have an adequate strength-to-weight ratio, and in particular they did not have adequate torsional rigidity, even though they were heavier than the conventional tube frame in many cases. Examples of prior U.S. patents disclosing hollow shell bicycle frames having these deficiencies are U.S. Pat. Nos. 3,233,916, 3,375,024, 4,230,332 and 4,613,146.

In view of the above disadvantages, it would therefore be desirable to provide a unitary monocoque frame formed from two half shells including a structure for joining the two half shells that is relatively simple and not labor intensive.

SUMMARY OF THE INVENTION

According to one aspect of the invention, a unitary monocoque frame is provided for a bicycle including a right half shell having a peripheral edge and a left half shell having a peripheral edge symmetrical with the peripheral edge of the right half shell. The right half shell includes an integrally formed head tube portion and an integrally formed seat tube collar. The left half shell includes a curved surface to join with the head tube portion and a cupped recess to receive the seat tube collar. A tongue extends along at least a portion of the peripheral edge of one of the right and left half shells. A groove extends along at least a corresponding portion of the peripheral edge of the other one of the right and left half shells. The tongue and groove are in mating engagement to join the right and left half shells forming the unitary monocoque frame.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
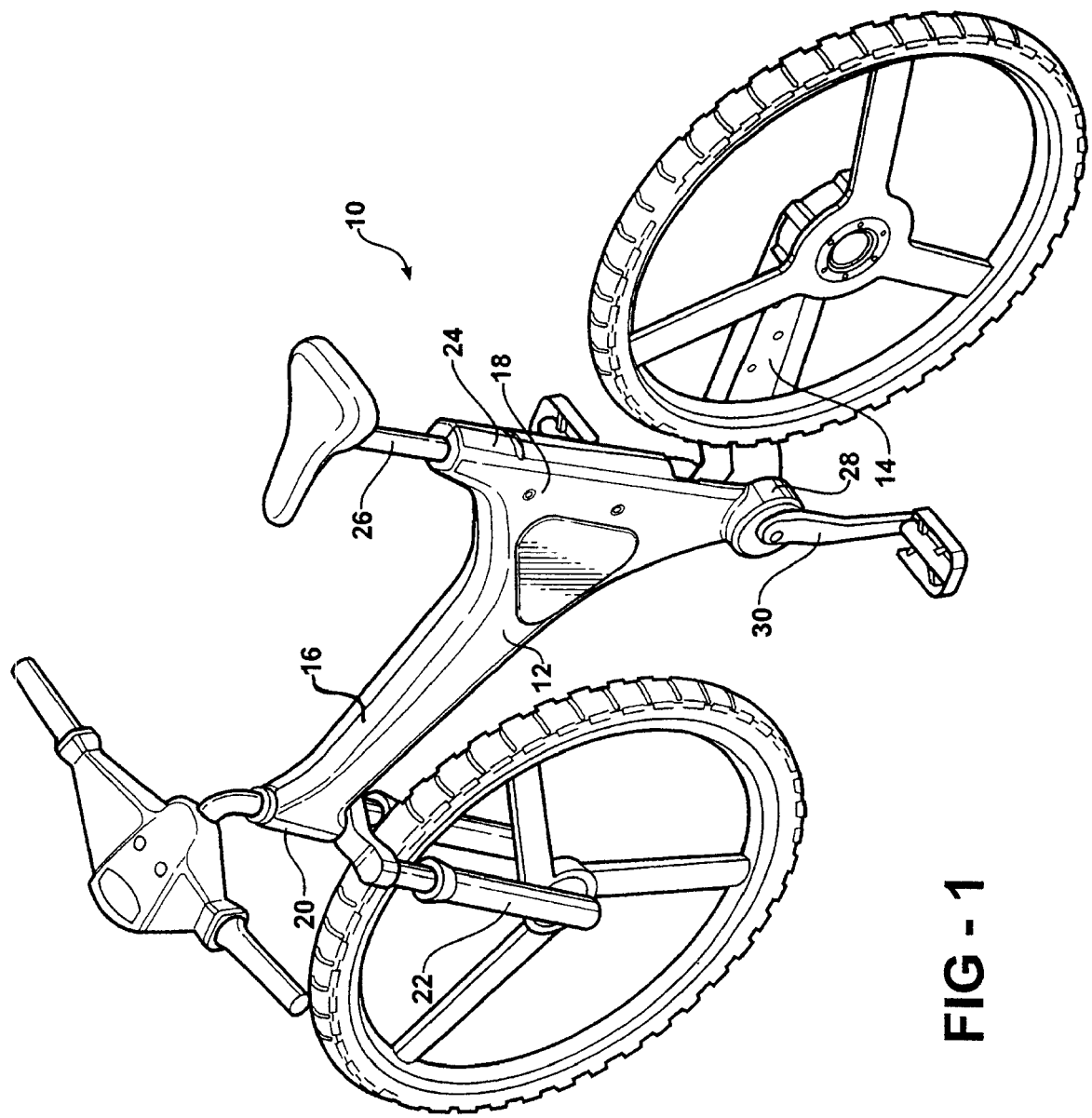
FIG. 1 is a perspective view of a bicycle including a unitary monocoque frame according to the preferred embodiment of the invention.

Referring to FIG. 1, a bicycle, generally shown at 10, includes a unitary monocoque frame 12 according to the preferred embodiment of the invention and a single-sided rear swing-arm 14 pivotally coupled thereto. The frame 12 includes an upper portion 16 that takes the place of the top tube and down tube on a conventional frame and a substantially vertical portion 18 that takes the place of the seat tube on the conventional frame. The frame 12 also includes a head tube portion 20 for rotatably coupling a front fork 22, a seat tube portion 24 for slidingly coupling a seat post 26, and a bottom bracket 28 for rotatably coupling a crank assembly 30. The existence and general arrangement of the frame 12 is known in the art and is not considered to be the invention. The invention is expressed in the particular structural characteristics of the frame 12.

Figure 2:
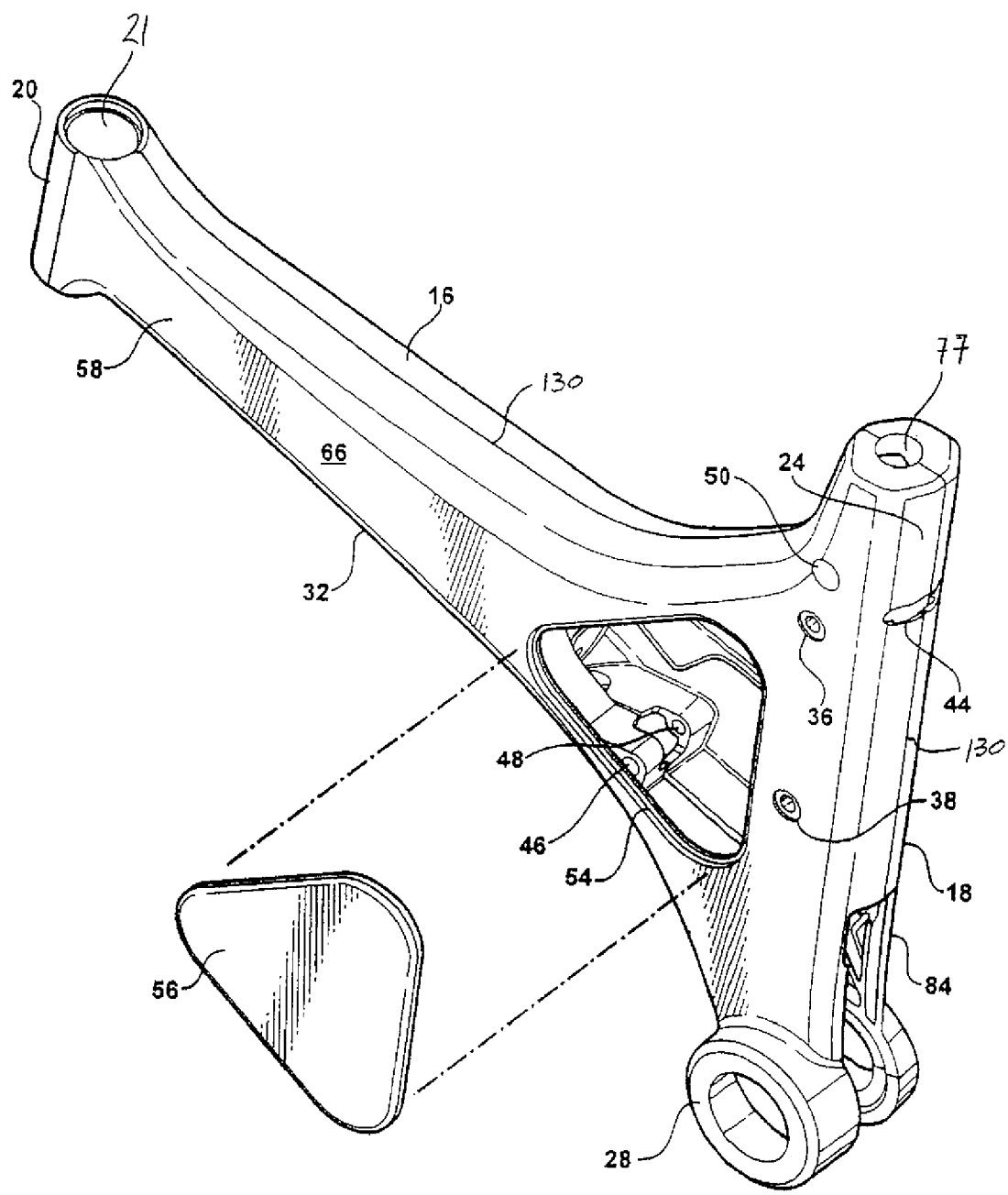
FIG. 2 is a perspective view of a left side of the frame.
Figure 3:
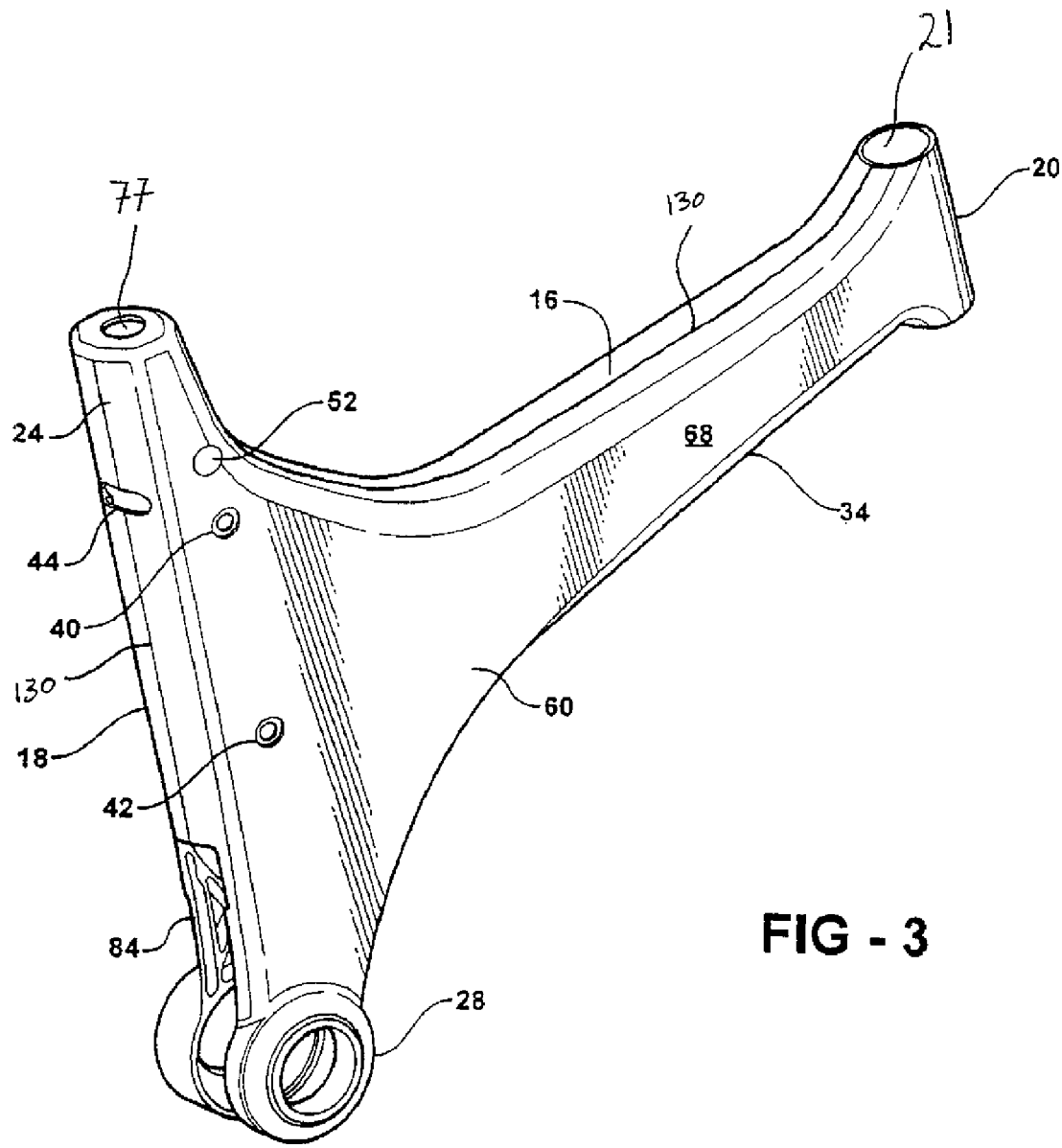
FIG. 3 is a perspective view of a right side of the frame.
Figure 4:
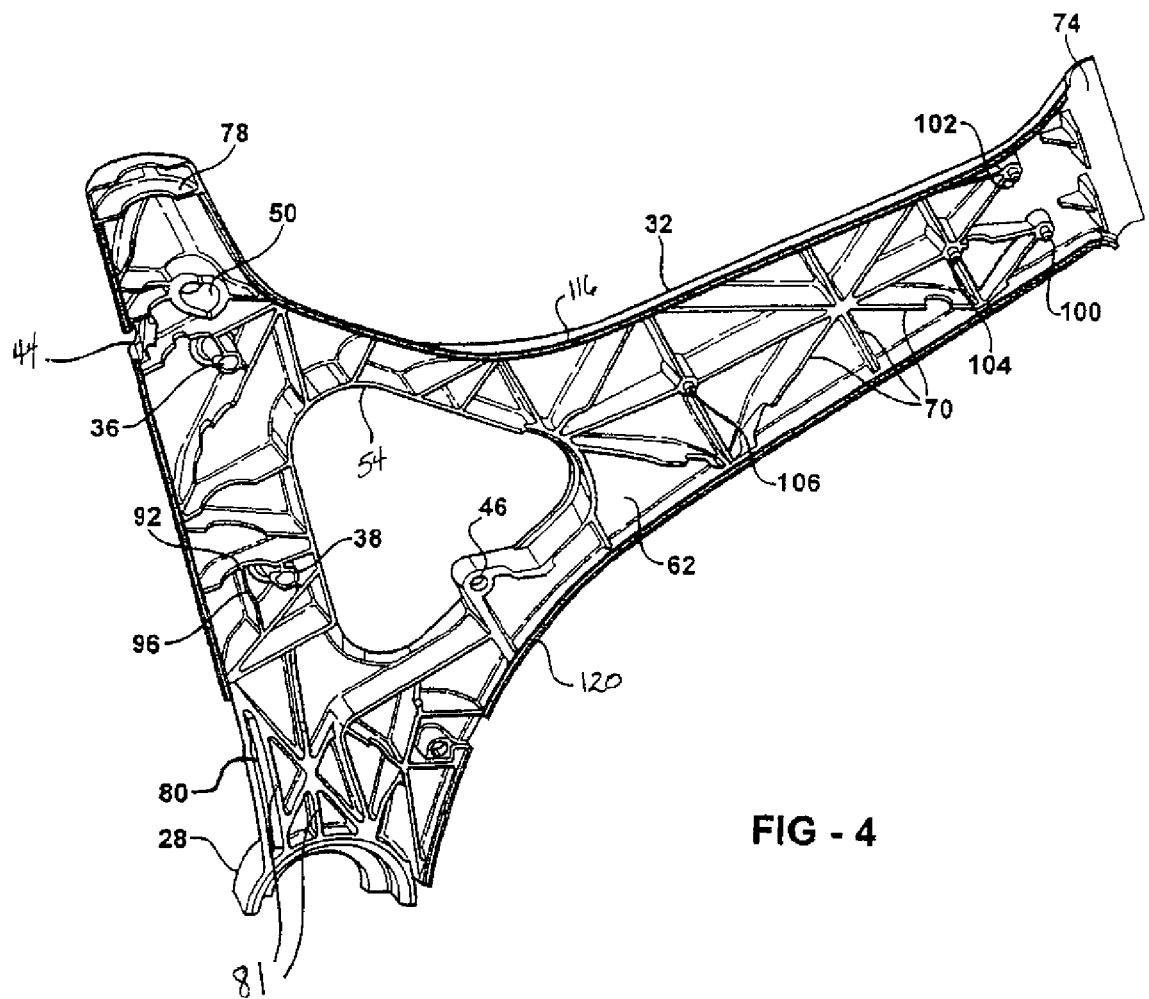
FIG. 4 is a perspective view of an inside surface of a left half shell.
Figure 5:
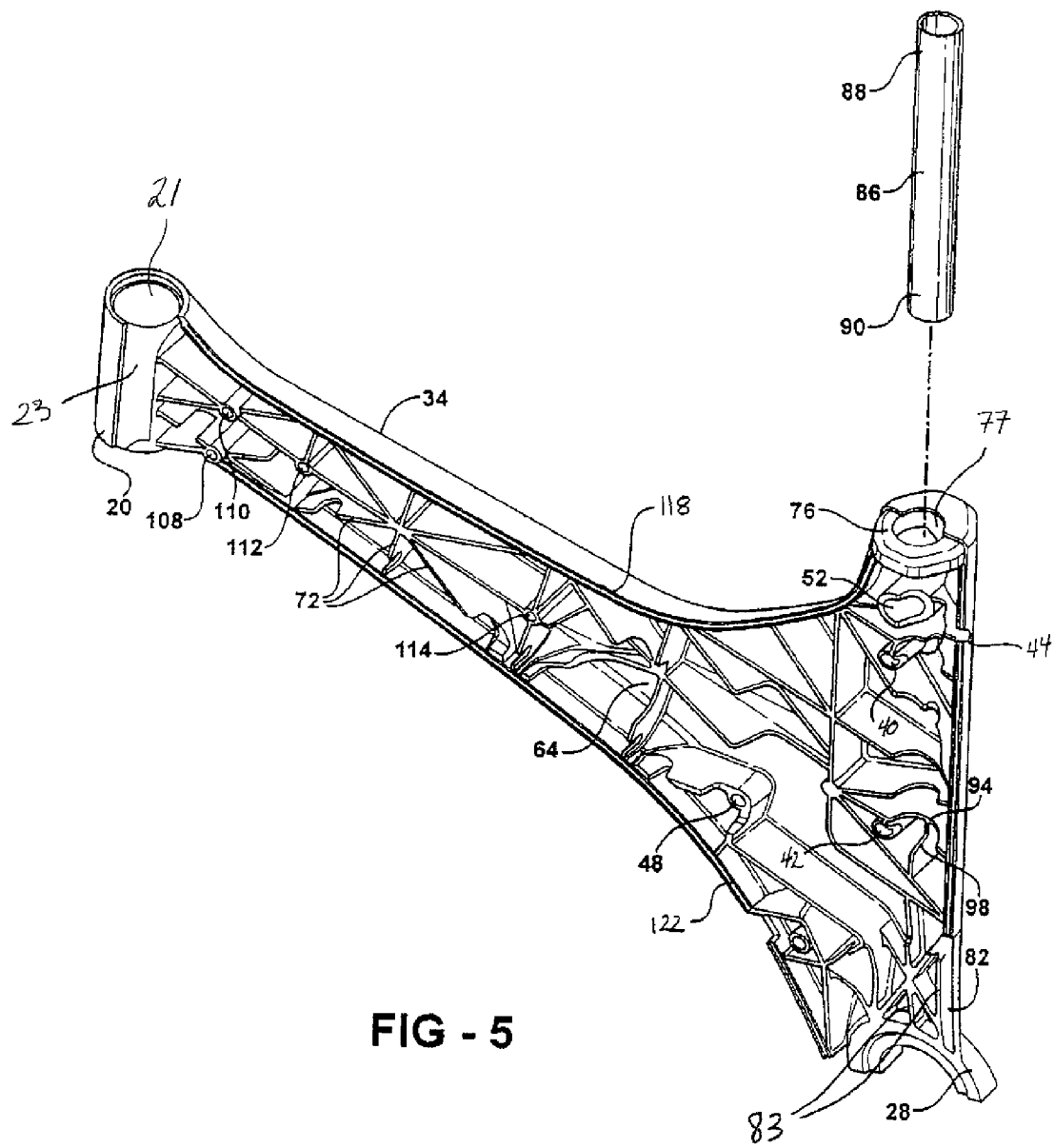
FIG. 5 is a perspective view of an inside surface of a right half shell.

Symmetrical left 32 and right 34 thin-walled half shells, shown in FIGS. 4 and 5, are joined and bonded together in a manner to be described shortly, to form the frame 12, shown in FIGS. 2 and 3. In the preferred embodiment of the invention, the left 32 and right 34 half shells are cast magnesium, although any suitably strong, durable and lightweight material may be used. Additionally, the left 32 and right 34 half shells may be manufactured using a molding process instead of a casting process. Various mounting points and features of the frame 12 are integrally formed with the left 32 and right 34 half shells. More specifically, the frame 12 includes mounting points 36, 38, 40, 42 for a rear fender (not shown), a mounting socket 44 for a tail light (not shown), mounting lugs 46, 48 for a spring/damper unit (not shown) for controlling the rear swing-arm 14, seat post locking lug bosses 50, 52 for fixedly securing the seat post 26, and a side aperture 54 for accessing the spring/damper unit and use as a storage compartment. A cover 56, shown in FIG. 2, removably coupled to the frame 12 encloses the side aperture 54 to keep dirt and moisture out when the bicycle 10 is being ridden.

Referring to FIGS. 2 through 5, the left 32 and right 34 half shells include outer sides 58, 60 and opposing inner sides 62, 64, respectively. The outer sides 58, 60 have a generally smooth surface 66, 68 in order to minimize wind drag when the bicycle 10 is being ridden. A plurality of reinforcing ribs 70, 72 extending from the inner sides 62, 64 are designed to disperse compressive and shear forces introduced by the rider when the bicycle 10 is being ridden. The plurality of reinforcing ribs 70, 72 also help prevent the left 32 and right 34 half shells from warping when they are removed from the casting die or mold. The head tube portion 20 of the frame 12 is a single contiguous element integrally formed with the right half shell 34. In other words, the head tube portion 20 is circumferentially enclosed thereby defining a first cylindrical opening 21 that is adapted for receiving a fork steerer tube therethrough. The left half shell 32 includes a curved surface 74 for joining with an exterior surface 23 of the head tube portion 20. Similarly, a seat tube collar 76 is a single contiguous element integrally formed with the right half shell 34. In other words, the seat tube collar 76 is circumferentially enclosed thereby defining a second cylindrical opening 77 that is adapted for receiving the seat post 26 therethrough. The left half shell 32 includes a cupped recess 78 for receiving the seat tube collar 76 therein. Since the head tube portion 20 and the seat tube collar 76 are designed as single contiguous elements of the right half shell 34, bonding failures due to excessive riding forces at the head tube portion 20 and the seat tube portion 24 can be prevented.

The left 32 and right 34 half shells include a recessed segment 80, 82 having a plurality of secondary reinforcing ribs 81, 83, wherein the depth of the plurality of secondary reinforcing ribs 81, 83 is reduced to form a gap or a space 84 extending laterally between the plurality of secondary reinforcing ribs 81, 83 of the left 32 and right 34 half shells. As shown in FIGS. 2 and 3, the recessed segments 80, 82 provide the gap or space 84 in the frame 12 at the bottom bracket 28. The space 84 between the left 32 and right 34 half shells allows the swing-arm 14 to pivot upwardly when the bicycle 10 is being ridden.

Referring to FIGS. 4 and 5, a seat post sleeve 86 is preferably a separate component that is bonded into the frame 12 due to the close tolerances required between the seat post sleeve 86 and the seat post 26. The seat post sleeve 86 is disposed within the seat tube portion 24 of the frame 12 and extends between an upper end 88 and a lower end 90. The upper end 88 of the seat post sleeve 86 is encircled by the seat tube collar 76. The lower end 90 is encircled by locating features 92, 94 and abuts stop features 96, 98 integrally formed within the left 32 and right 34 half shells, respectively.

Four dowels 100, 102, 104, 106 are integrally formed with and extend from the plurality of reinforcing ribs 70 of the inner side 62 of the left half shell 32, as shown in FIG. 4. Four receptacles 108, 110, 112, 114 are integrally formed with the plurality of reinforcing ribs 72 of the inner side 64 of the right half shell 34, as shown in FIG. 5. The receptacles 108, 110, 112, 114 receive the corresponding dowels 100, 102, 104, 106 when the left 32 and right 34 half shells are joined together to form the frame 12.

Additionally, the left half shell 32 includes a peripheral edge 116, shown in FIG. 4. The right half shell 34 includes a peripheral edge 118, shown in FIG. 5, symmetrical with the peripheral edge 116 of the left half shell 32. A tongue 120 extends along and protrudes from at least a portion of the peripheral edge 116 of the left half shell 32. A groove 122 extends along and is recessed in at least a corresponding portion of the peripheral edge 118 of the right half shell 34. More specifically, referring to FIGS. 6 and 7, a recessed step 124 in the outer side 58 of the left half shell 32 along the peripheral edge 116 forms the tongue 120. The generally U-shaped groove 122 is recessed into the peripheral edge 118 of the right half shell 34 parallel to the tongue 120. The groove 122 includes an inner leg 126 and an outer leg 128. The right 32 and left 34 half shells may be joined by causing the tongue 120 to enter into and firmly engage with the corresponding groove 122. Similarly, the dowels 100, 102, 104, 106 will enter into and firmly engage with the corresponding receptacles 108, 110, 112, 114. After the left 32 and right 34 half shells are joined, the outer leg 128 of the groove 122 is disposed in the recessed step 124 such that a smooth seam 130 is formed at the peripheral edges 116, 118.

Figure 6:
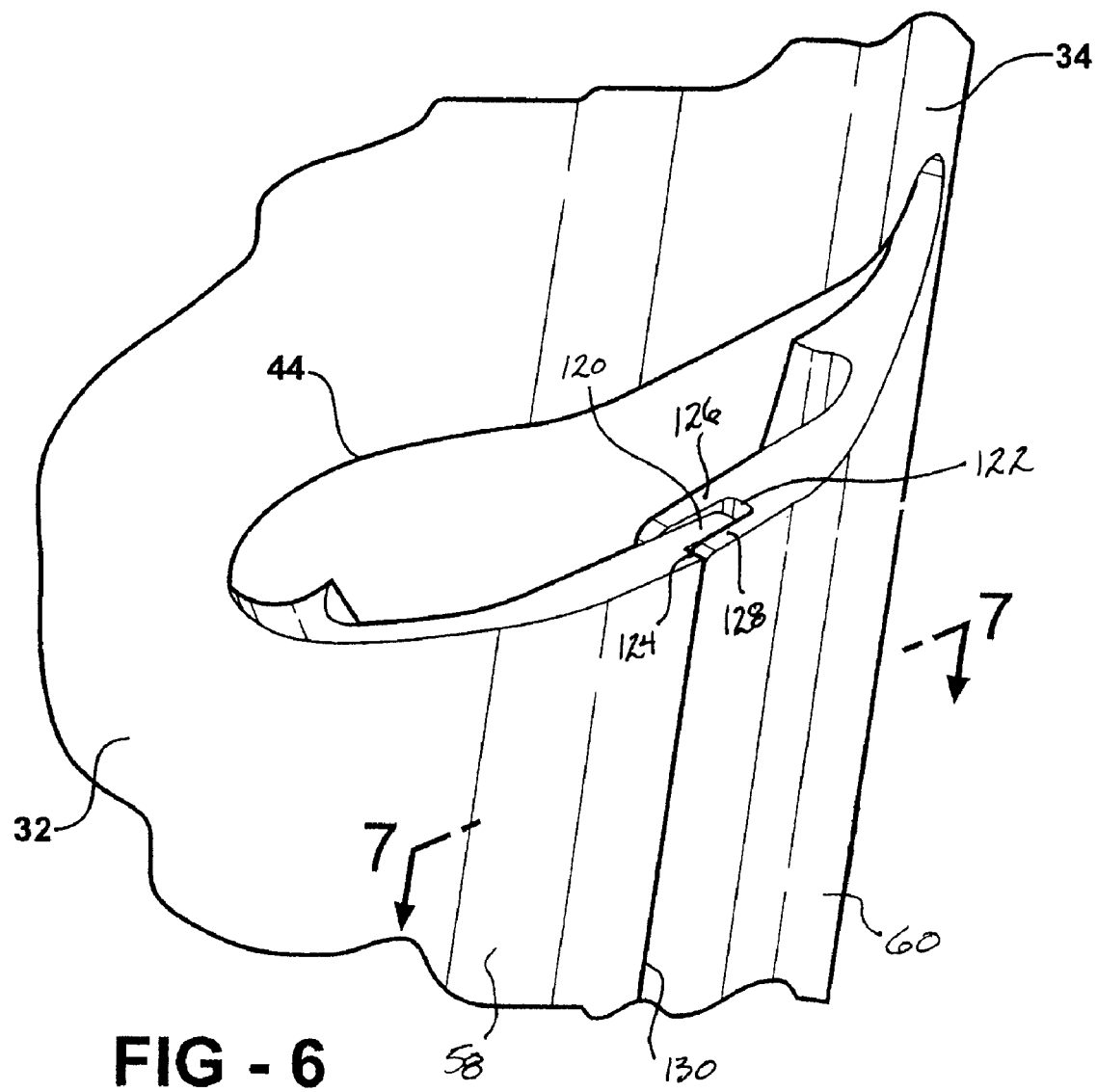
FIG. 6 is a fragmentary, perspective view of the frame showing a tongue and groove in mating engagement.
Figure 7:
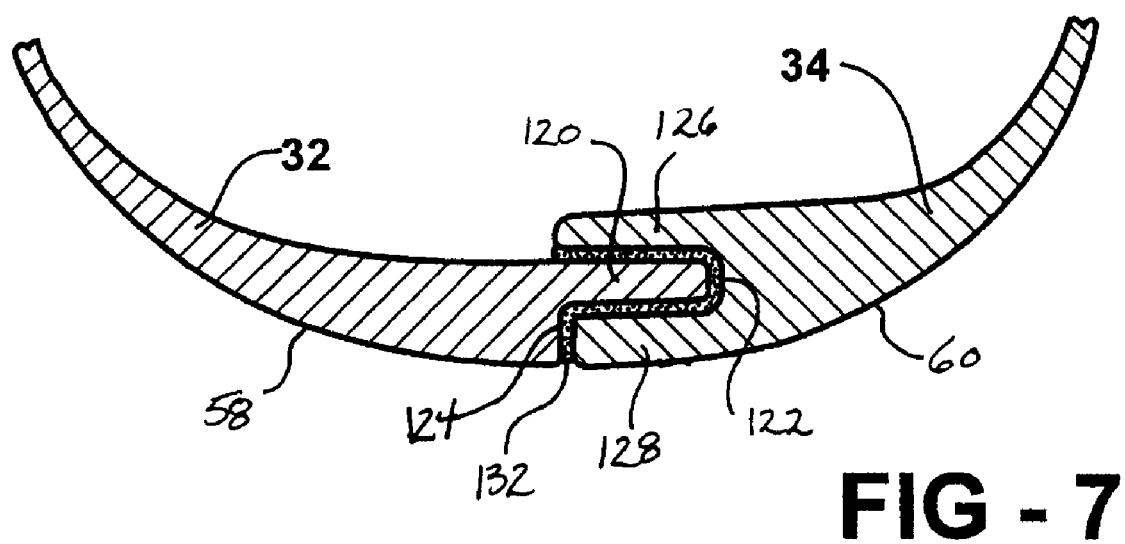
FIG. 7 is a cross-sectional view taken along lines 7-7 of FIG. 6, showing the tongue and groove in mating engagement.

The interface between the tongue 120 and groove 122 is best seen in FIGS. 6 and 7. Prior to joining the left 32 and right 34 half shells together, a bonding adhesive 132 is applied to the tongue 120 and groove 122, as well as to the step 124. When the left 32 and right 34 half shells are joined the bonding adhesive 132 helps prevent the left 32 and right 34 half shells from moving apart. Similarly, the bonding adhesive 132 can be applied to the dowels 100, 102, 104, 106 and receptacles 108, 110, 112, 114. The use of the dowels 100, 102, 104, 106 and receptacles 108, 110, 112, 114 provides the advantage of guiding the left 32 and right 34 half shells together in precisely the correct orientation during assembly. The use of the tongue 120 and groove 122 provides the advantage of substantially increasing the available bonding surface area compared to the bonding surface area that would be available if the peripheral edges 116, 118 of the left 32 and right 34 half shells were flat. Therefore, a stronger bond between the left 32 and right 34 half shells results.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A unitary monocoque frame for a bicycle, said unitary monocoque frame comprising:
   a right half shell having a peripheral edge, said right half shell including an integrally formed head tube portion and an integrally formed seat tube collar, said head tube portion is circumferentially enclosed thereby defining a first cylindrical opening that is adapted for receiving a fork steerer tube therethrough;

a left half shell having a peripheral edge symmetrical with said peripheral edge of said right half shell, said left half shell including a curved surface to join with said head tube portion and a cupped recess to receive said seat tube collar therein; and wherein one of said right and left half shells includes a tongue extending along and protruding from at least a portion of said peripheral edge thereof in mating engagement with a groove extending along and recessed in at least a corresponding portion of said peripheral edge of said other one of said right and left half shells to join said right and left half shells forming said unitary monocoque frame.

2. A unitary monocoque frame as set forth in claim 1 wherein a bonding adhesive is applied to said tongue and groove prior to joining said left and right half shells.

3. A unitary monocoque frame as set forth in claim 2 wherein each of said left and right half shells include an outer side having a generally smooth surface and an opposing inner side having a plurality of reinforcing ribs.

4. A unitary monocoque frame as set forth in claim 3 wherein said tongue is defined by a recessed step in said outer side of one of said right and left half shells and said groove of said other one of said right and left half shells includes an inner leg and an outer leg, said tongue disposed in said groove and said outer leg disposed in said recessed step when said right and left half shells are joined forming said unitary monocoque frame.

5. A unitary monocoque frame as set forth in claim 4 wherein each of said left and right half shells include a recessed segment having a plurality of secondary reinforcing ribs, wherein the depth of said plurality of secondary reinforcing ribs form a space extending laterally between said plurality of secondary reinforcing ribs of said left and right half shells when said right and left half shells are joined forming said unitary monocoque frame, said space extending substantially perpendicular to said peripheral edges of said left and right half shells.

6. A unitary monocoque frame as set forth in claim 5 including a seat post sleeve disposed in said unitary monocoque frame.

7. A unitary monocoque frame as set forth in claim 6 wherein said seat post sleeve extends between an upper end encircled by said seat tube collar and a lower end encircled by locating features and abutting stop features within said unitary monocoque frame.

8. A unitary monocoque frame as set forth in claim 7 including a plurality of dowels integrally formed with and extending from said plurality of reinforcing ribs of said inner side of one of said right and left half shells in mating engagement with a plurality of receptacles integrally formed with said plurality of reinforcing ribs of said inner side of said other one of said right and left half shells.

9. A unitary monocoque frame as set forth in claim 8 wherein said bonding adhesive is applied to said plurality of dowels and receptacles prior to joining said left and right half shells.

10. A unitary monocoque frame as set forth in claim 1 wherein said seat tube collar is circumferentially enclosed thereby defining a second cylindrical opening that is adapted for receiving a seat post therethrough.

11. A unitary monocoque frame for a bicycle, said unitary monocoque frame comprising:

a right half shell having a peripheral edge, said right half shell including an integrally formed head tube portion and an integrally formed seat tube collar, said seat tube collar is circumferentially enclosed thereby defining a second cylindrical opening that is adapted for receiving a seat post therethrough;

a left half shell having a peripheral edge symmetrical with said peripheral edge of said right half shell, said left half shell including a curved surface to join with said head tube portion and a cupped recess to receive said seat tube collar therein; and wherein one of said right and left half shells includes a tongue extending along and protruding from at least a portion of said peripheral edge thereof in mating engagement with a groove extending along and recessed in at least a corresponding portion of said peripheral edge of said other one of said right and left half shells to join said right and left half shells forming said unitary monocoque frame.

12. A unitary monocoque frame as set forth in claim 11 wherein a bonding adhesive is applied to said tongue and groove prior to joining said left and right half shells.

13. A unitary monocoque frame as set forth in claim 11 wherein each of said left and right half shells include an outer side having a generally smooth surface and an opposing inner side having a plurality of reinforcing ribs.

14. A unitary monocoque frame as set forth in claim 13 wherein said tongue is defined by a recessed step in said outer side of one of said right and left half shells and said groove of said other one of said right and left half shells includes an inner leg and an outer leg, said tongue disposed in said groove and said outer leg disposed in said recessed step when said right and left half shells are joined forming said unitary monocoque frame.

15. A unitary monocoque frame as set forth in claim 11 wherein each of said left and right half shells include a recessed segment having a plurality of secondary reinforcing ribs, wherein the depth of said plurality of secondary reinforcing ribs form a space extending laterally between said plurality of secondary reinforcing ribs of said left and right half shells when said left and right half shells are joined forming said unitary monocoque frame, said space extending substantially perpendicular to said peripheral edges of said left and right half shells.

16. A unitary monocoque frame as set forth in claim 11 including a seat post sleeve disposed in said unitary monocoque frame.

17. A unitary monocoque frame as set forth in claim 16 wherein said seat post sleeve extends between an upper end encircled by said seat tube collar and a lower end encircled by locating features and abutting stop features within said unitary monocoque frame.

18. A unitary monocoque frame as set forth in claim 13 including a plurality of dowels integrally formed with and extending from said plurality of reinforcing ribs of said inner side of one of said right and left half shells in mating engagement with a plurality of receptacles integrally formed with said plurality of reinforcing ribs of said inner side of said other one of said right and left half shells.

19. A unitary monocoque frame as set forth in claim 18 wherein said bonding adhesive is applied to said plurality of dowels and receptacles prior to joining said left and right half shells.

20. A unitary monocoque frame as set forth in claim 11 wherein said head tube portion is circumferentially enclosed thereby defining a first cylindrical opening that is adapted for receiving a fork steerer tube therethrough.

* * * * *